(12) United States Patent
Geiger (10) Patent No.: US 9,548,918 B2
(45) Date of Patent: Jan. 17, 2017

(54) EDGE ROUTER SYSTEMS AND METHODS

(71) Applicant: General Electric Company, Schenectady, NY (US)

(72) Inventor: John Andrew Geiger, Rochester, NY (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 14/193,803

(22) Filed: Feb. 28, 2014

(65) Prior Publication Data

US 2015/0249595 A1 Sep. 3, 2015

(51) Int. Cl.

| | |
|---|---|
| *H04L 12/28* | (2006.01) |
| *H04L 12/56* | (2006.01) |
| *H04L 12/707* | (2013.01) |
| *H04J 3/06* | (2006.01) |
| *H04L 12/721* | (2013.01) |
| *H04L 12/64* | (2006.01) |

(52) U.S. Cl.
CPC ............ *H04L 45/24* (2013.01); *H04J 3/0638* (2013.01); *H04L 12/6418* (2013.01); *H04L 45/123* (2013.01)

(58) Field of Classification Search
CPC .. H04L 45/00; H04L 29/0653; H04L 49/3009; H04L 47/10; H04L 29/06
USPC ........................................................ 370/392
See application file for complete search history.

(56) References Cited

U.S. PATENT DOCUMENTS

| | | | | |
|---|---|---|---|---|
| 6,424,625 | B1 * | 7/2002 | Larsson | H04L 1/1806 370/236 |
| 7,826,366 | B2 | 11/2010 | Wu et al. | |
| 7,965,761 | B2 | 6/2011 | Shattil | |
| 8,611,442 | B2 * | 12/2013 | Ratasuk | H04L 5/003 375/260 |
| 8,619,687 | B2 | 12/2013 | Choudhury et al. | |
| 8,755,457 | B2 * | 6/2014 | Higuchi | H04J 11/003 375/299 |
| 8,837,454 | B2 * | 9/2014 | Hegde | H04W 16/14 370/330 |

(Continued)

FOREIGN PATENT DOCUMENTS

EP 2651171 A1 10/2013

OTHER PUBLICATIONS

International Search Report and Written Opinion issued in connection with corresponding PCT Application No. PCT/US2015/017188 dated May 4, 2015.

(Continued)

*Primary Examiner* — Peter Cheng
*Assistant Examiner* — Sanjay K Dewan
(74) *Attorney, Agent, or Firm* — Armstrong Teasdale LLP (57) ABSTRACT

A system including an edge router which collects data from a mesh network by receiving on multiple simultaneous frequencies. Using N simultaneous frequencies increases the throughput of a system by up to N-times, reducing the bottleneck that otherwise occurs at the take-out-point of a mesh communications system. Furthermore, nodes in direct communication with the edge router can send each data packet multiple times on multiple frequencies, increasing the probability that the packet is delivered correctly, eliminating the necessity to acknowledge (ACK) each packet. This further enhances system throughput.

20 Claims, 4 Drawing Sheets

(56) References Cited

U.S. PATENT DOCUMENTS

| | | | |
|---|---|---|---|
| 2002/0109879 A1 | 8/2002 | Wing et al. | |
| 2003/0140296 A1* | 7/2003 | Odman | H04W 74/02 714/749 |
| 2004/0199662 A1* | 10/2004 | Karol | H04L 63/18 709/238 |
| 2004/0229566 A1 | 11/2004 | Wang et al. | |
| 2005/0208949 A1 | 9/2005 | Chiueh | |
| 2006/0002361 A1* | 1/2006 | Webster | H04B 7/0697 370/343 |
| 2006/0013125 A1* | 1/2006 | Vasseur | H04L 45/02 370/217 |
| 2006/0029061 A1* | 2/2006 | Pister et al. | 370/389 |
| 2006/0146718 A1* | 7/2006 | Yarvis | H04L 45/00 370/238 |
| 2006/0233137 A1* | 10/2006 | Dantu | H04L 12/5695 370/331 |
| 2007/0258508 A1* | 11/2007 | Werb | H04W 84/18 375/140 |
| 2008/0013599 A1 | 1/2008 | Malladi | |
| 2008/0089286 A1* | 4/2008 | Malladi | H04B 1/7143 370/330 |
| 2010/0061272 A1* | 3/2010 | Veillette | 370/254 |
| 2010/0265842 A1* | 10/2010 | Khandekar | H04W 72/0433 370/252 |
| 2011/0060956 A1* | 3/2011 | Goldsmith | H04B 7/024 714/746 |
| 2011/0176464 A1 | 7/2011 | Warner et al. | |
| 2012/0046000 A1* | 2/2012 | Gao | H04W 72/02 455/73 |
| 2012/0057449 A1* | 3/2012 | Takaoka et al. | 370/210 |
| 2013/0016759 A1* | 1/2013 | Hui | H04B 1/713 375/135 |
| 2013/0195022 A1* | 8/2013 | Nguyen et al. | 370/329 |
| 2013/0207466 A1* | 8/2013 | Lee et al. | 307/23 |
| 2013/0227689 A1 | 8/2013 | Pietrowicz | |
| 2013/0294284 A1* | 11/2013 | Popa et al. | 370/254 |
| 2014/0081793 A1 | 3/2014 | Hoffberg | |
| 2014/0156867 A1* | 6/2014 | Davari | H04L 45/44 709/238 |
| 2014/0179334 A1* | 6/2014 | Forenza | H04B 7/024 455/452.2 |

OTHER PUBLICATIONS

Kinney, "Examples of Mesh Networking over IEEE 802.15.4; 15-13-0493-01-0000-examples-of-mesh-networking-over-ieee-802-15-4", IEEE Draft; IEEE-SA Mentor, vol. No. 802.15, Issue No. 1, pp. 1-37, Sep. 4, 2013.

* cited by examiner

EDGE ROUTER SYSTEMS AND METHODS

BACKGROUND OF THE INVENTION

The subject matter disclosed herein relates to routing data, and more specifically, to routing data using a mesh router.

Some communication networks, such as smart grid metering networks, (e.g., relating to an electrical power grid) may include mesh networks where each mesh network node may be used in routing the data of neighboring nodes. Different routing techniques may be used. For example, the nodes may route packets through the network using forwarding tables that are stored in the nodes. The forwarding tables generally identify a next-hop node based on the packet's destination. The next-hop node is generally the same for all packets having the same destination regardless of the packet's originating node. The forwarding tables are conventionally generated by selecting paths through the network in a hop-by-hop fashion based on next-hops with the lowest cost. Other non-table based routing techniques may also be used. It would be useful to improve on the routing techniques.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an edge router including a first receiver configured to receive a first frequency. The edge router further includes a transmitter circuitry configured to transmit a data on a plurality of M frequency hopped channels and a multichannel receiver circuitry configured to receive a plurality of packets on a plurality of L independent frequencies transmitted by a plurality of nodes, wherein the multichannel receiver circuitry is configured to provide for a packet exchange protocol by receiving a packet in the plurality of packets a plurality of times without using an acknowledgement packet (ACK).

In a second embodiment, a system includes a multi-channel edge router. The multi-channel edge router includes a plurality of receivers configured to use a plurality of frequencies, wherein each of the plurality of receivers is configured to communicate on a different frequency. The system additionally includes a non-transitory machine-readable medium comprising code configured to receive data from a plurality of nodes in direct communication with the multi-channel edge router, broadcast a beacon, synchronize a transmission of data from each of the plurality of nodes based on the beacon, and receive data from each of the plurality of nodes to the multi-channel edge router approximately simultaneously a plurality of times redundantly so that the use of an acknowledgement packet (ACK) is not required for reliable packet transfer from a node to the edge router.

In a third embodiment, a method includes selecting a second radio frequency at random and discovering a second node disposed on the wireless mesh network, wherein the second node is not in direct communication with the multi-channel edge router. The method further includes assigning a second frequency hopping pattern to the second node based on the second radio frequency and communicating data between the second node and the multi-channel edge router by using the intermediate node, wherein the intermediate node is in direct communication with the multi-channel edge router and with the second node, and wherein the second node is configured to use the second frequency hopping pattern to communicate with the intermediate node.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain communication networks, such as a mesh networks, may include multiple nodes intermeshed or communicatively coupled to other nodes. These networks may be used in a variety of applications, such as electrical power grids having utility meters (e.g. smart meters) at various locations (e.g. businesses, residences, etc.) throughout the grid. In a smart grid network example, a network node may include an advanced metering infrastructure (AMI) smart meter communicatively connected to one or more neighborhood meters. These meters monitor and/or control the flow of a utility (e.g. electricity, water, or gas) into the location (e.g., building). The intercommunication between nodes is referred to as a mesh network. Mesh networks enable enhanced communication reliability due to the multiple paths that may be present between nodes. Should one path fail, a second path may be used to communicate with the node. Certain mesh networks may use the Institute for Electrical and Electronics Engineers (IEEE) 802.15.4 specification for enabling mesh network communications. Other specifications or standards may also be used, such as Zig-Bee, Optimized Link State Routing Protocol (OLSR), Babel, Ad hoc On-Demand Vector Routing (AODV), and/or Destination-Sequenced Distance Vector Routing (DSDV).

In certain mesh networks, the nodes may be functionally organized in a tree structure, with a root or edge node communicatively coupled with varying levels of branch nodes. The edge node may then facilitate communications between branch nodes and other systems, such as internet-based systems. Because the edge node may be communicatively coupled to a plurality of branch nodes, the edge node may become a communicative bottleneck. For example, in traditional systems, such as those following the IEEE 802.15.4 standard, the edge node may only communicate through a single channel. The embodiments described herein include routing systems, methods, and computer instructions stored in a non-transient computer readable medium useful for enabling multichannel communications at the edge node of a mesh network. The multichannel communications may minimize or eliminate the edge node as a communications bottleneck. Indeed, the use of the systems, methods, and computer instructions described herein, may enable a substantial increase in communications throughput between the edge node and branch nodes, thus increasing the node density (e.g., total number of branch nodes) communicating via the edge node. This increased throughput may be particularly beneficial for various applications, such as utility meters (e.g., smart meters) distributed throughout a utility grid (e.g., electrical power grid).

Each node may use a different frequency hopping pattern suitable for sending and receiving data packets. The edge node may use hardware and/or software techniques, as described in more detail below, to implement a multichannel edge router suitable for using all the available frequencies to communicate with branch nodes. Unique frequency hopping patterns may further enable the use of all available frequencies. By employing all available frequencies, including non-standard frequencies (e.g., unlicensed frequencies not licensed by the Federal Communications Commission [FCC]), the systems and methods described herein may support a higher density of nodes per geographic area. In a smart grid example, the systems and methods may increase the data capacity from remote nodes to the edge router ten to hundred times the data capacity of a single channel edge router. The edge router is configured to broadcast a beacon used to synchronize a transmission of data from each of the plurality of nodes based on the beacon. Further, the edge router is configured to receive data from each of the plurality of nodes approximately simultaneously. Each node transmits on a nearly uncorrelated frequency hopping pattern over the available frequency channels. Multiple nodes can simultaneously transmit using the using the uncorrelated hopping pattern with a known probability of collision per packet. Transmitting the packet on multiple frequencies removes the need for acknowledging (ACK) each packet; rather resend the message using a set of N uncorrelated frequencies from the set of available frequencies. If any one of the N transmissions is received the message is received correctly. The probability of error P can be arbitrarily reduced to $P^N$.

Figure 1:
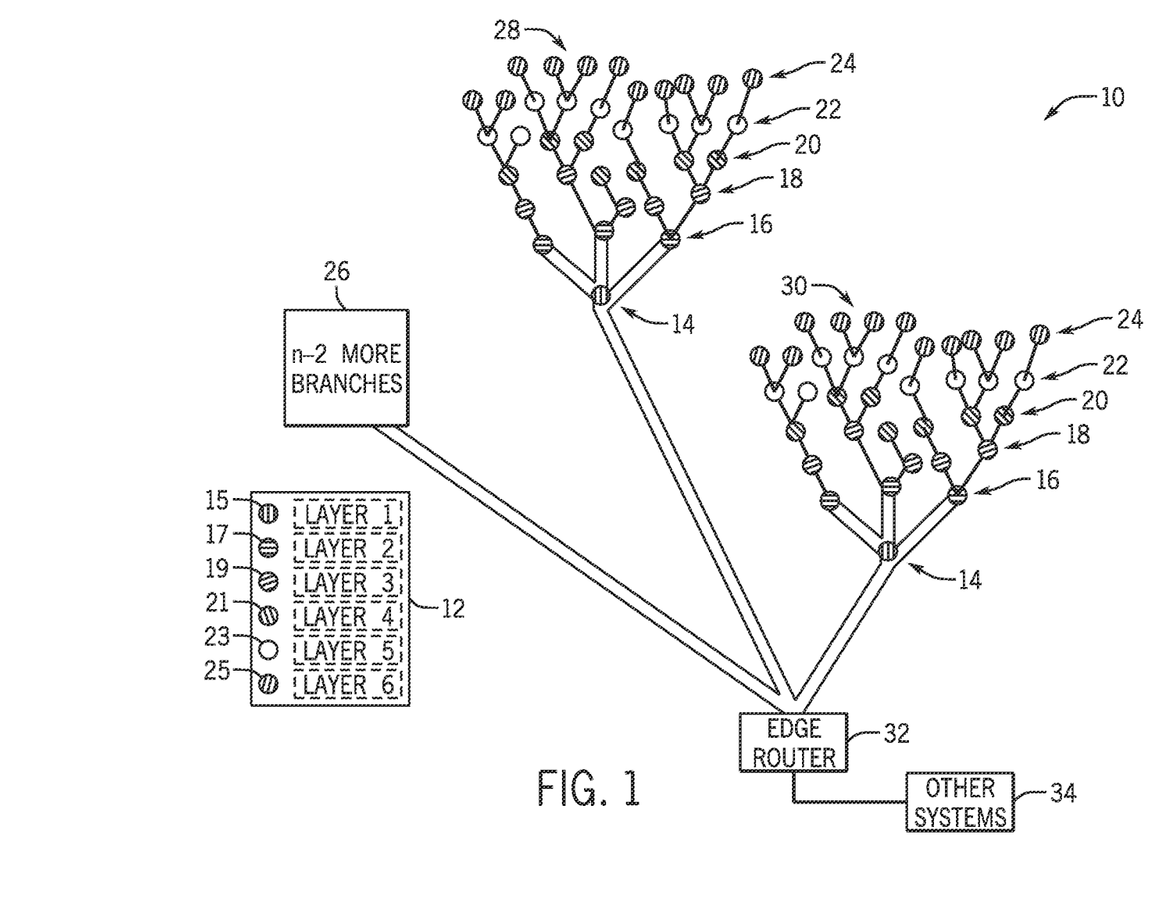
FIG. 1 is a schematic diagram illustrating an embodiment of a multichannel wireless mesh network.

With the foregoing in mind, FIG. 1 is a block diagram illustrating an embodiment of a multichannel wireless mesh network 10. A legend 12 is also depicted, suitable for identifying various branch nodes 14, 16, 18, 20, 22, and 24. The nodes 14, 16, 18, 20, 22, and 24 may include almost any device that operates as a wireless router, including an (advance metering infrastructure) AMI smart meter (e.g., an electricity, gas, or water meter of a utility grid), a personal digital assistant (PDA), a laptop or portable computer, a tablet, a cell phone, a wireless headset, a pager, an instant messaging device, a digital camera, an access point, or other device that may receive and/or transmit information wirelessly. In the depicted embodiment, nodes 14 are disposed at a first level or layer of the network 10, nodes 16 are disposed at a second level, nodes 18 are disposed at a third level, nodes 20 are disposed at a fourth level, nodes 22 are disposed at a fifth level, and nodes 24 are disposed at a sixth level of the network 10. Accordingly, the legend 12 includes icons 15, 17, 19, 21, 23, and 25, used to identify the nodes 14, 16, 18, 20, 22, and 24, respectively. It is to be noted that, in other embodiments, more or less network 10 levels may be used. Also depicted is a section 26 of the network 10 that includes n−2 additional branches, similar to branches 28 and 30, which may include additional nodes at various levels. In a smart grid example, the nodes 14, 16, 18, 20, 22, and 24 may include AMI smart meters suitable for measuring and providing information to the smart grid (e.g., a utility grid such as a electrical power grid, a water grid, or a gas grid). For example, the nodes 14, 16, 18, 20, 22, and 24 may include electric smart meters, water meters, gas meters, and the like, used to meter or consumption of utilities.

Each of the node nodes 14, 16, 18, 20, 22, and 24 may automatically form an ad hoc mesh network when the node is introduced into the network 10. For example, each of the nodes 14, 16, 18, 20, 22, and 24 may communicate with neighboring nodes 14, 16, 18, 20, 22, and 24 by using a mesh network protocol, such as the Routing Protocol for Low power and lossy Networks (RPL) protocol or standards, and self-configure as a communicating member of the network 10. For example, ad hoc discovery, handshaking, and so forth, may be used during self-configuration. As mentioned above, other protocols or standards may be used alternative or additional to RPL, including the IEEE 802.15.4 standard, ZigBee, OLSR, Babel, AODV, DSDV, and so on. By automatically forming a mesh network, the nodes 14, 16, 18, 20, 22, and 24 and nodes found in section 26 of the multichannel wireless mesh network 10 may provide for a robust, scalable network. For example, redundancy may be provided by including multiple wireless communication paths. Should a node become inoperative, other neighboring nodes (e.g., nodes within wireless signal reach) may be used to send and receive data through the network 10. Such capabilities allow the network 10 to minimize infrastructure components, as the nodes themselves provide for most of the infrastructure used by the network 10. Indeed, cabling and switches are minimized or eliminated. Additionally, because the nodes 14, 16, 18, 20, 22, and 24 may provide for techniques suitable for ad hoc discovery and handshaking with neighboring nodes 14, 16, 18, 20, 22, and 24, the setup time and cost for the network 10 may be minimized.

In the illustrated embodiment, the multichannel wireless mesh network 10 includes an edge router 32 directly connected with the nodes 14 in layer 1, and indirectly connected with the nodes 16, 18, 20, 22, and 24 in the remaining layers (e.g., layers 2, 3, 4, 5, and 6). It is to be noted that, while the depicted network 10 includes one edge router 32, multiple edge routers 32 may be used. In the presently contemplated embodiment, the edge router 32 may directly communicate with each node in level 1, while the remainder levels (e.g., levels 2, 3, 4, 5, and 6) of nodes may communicate with each other. Eventually, data from levels 2, 3, 4, 5, and 6 may make its way up to the edge router 32. Additionally, the edge router 32 may be communicatively coupled to other systems 34. The other systems 34 may include intranet and/or internet systems, such as a utility provider (e.g., electricity, water, gas provider) that may collect or meter utility usage data, outage data, and the like, by using the nodes 14, 16, 18, 20, 22, and 24. The utility provider may then use the data to bill customers, to analyze usage patterns, to react to utility outages, and so on.

In one example, the other systems 34 may communicate with the edge router 32 and nodes 14, 16, 18, 20, 22, and 24 by using internet protocol version 6 (IPv6) standard and data packets using the Internet Engineering Task Force (IETF) Request for Comments (RFC) 4944. Indeed, IPv6 data packets may be sent through the network system 10, such as IETF RFC 4944 data packets.

The IETF RFC 4944 data packets may be particularly constructed to be used in conjunction with the IEEE 802.15.4 standard. Other communication standards may be used by the other systems 34, including but not limited to the internet protocol version 4 (IPv4). By providing for a link between the nodes 14, 16, 18, 20, 22, and 24, and the other systems 34, the edge router 32 may increase the number of nodes 14, 16, 18, 20, 22, and 24 communicating with the other systems 34, and may do so in a more efficient and cost-effective manner. Accordingly, unsolicited meter reads (e.g., query of data from any node 14, 16, 18, 20, 22, and 24 from the utility provider) may be sent using IPv6.

Figure 2:
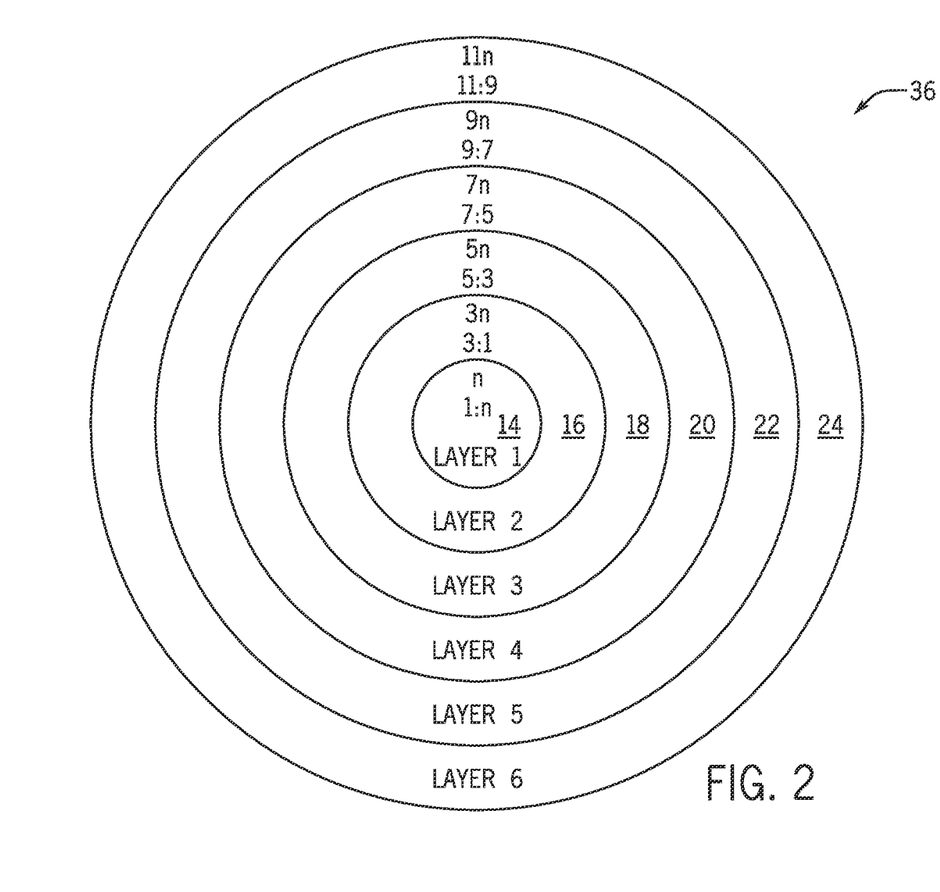
FIG. 2 is a node density diagram illustrating an embodiment of a node density for the multichannel wireless mesh network of FIG. 1.

FIG. 2 illustrates an embodiment of a node density diagram 36 depicting a set of concentric rings representing the relative area each layer of the nodes 14, 16, 18, 20, 22, and 24 of the mesh will occupy. Each ring has the same thickness equal to the average range of peer to peer connection. As mentioned above, nodes 14 disposed in layer 1 would be communicatively coupled directly to the multichannel edge router 32. Accordingly, layer 1 is depicted as the center of the diagram 36. The nodes 16 at layer 2 may connect with the edge router 32 through layer 1. Accordingly, layer 2 is depicted as surrounding layer 1. In a similar manner, the nodes 18 at layer 3 connect with the edge router 32 through layer 2, the nodes 20 at layer 4 connect with the edge router 32 through layer 3, the nodes 24 at layer 6 connect with the edge router 32 through layer 4, the nodes 22 at layer 5 connect with the edge router 32 through layer 5, and so on. Accordingly, incremental layers are shown as surrounding the previous layer. The edge router 32 would then be disposed at layer 0.

Given that nodes are uniformly distributed over an area, layer 1 is defined to have n nodes, the ratio of nodes at level 1 connecting to the edge router is 1:n. As depicted, Layer 2 has 3× the area of layer 2 and thus assuming uniformly distributed nodes has 3n nodes, layer 3 has 5× the area of layer 1 thus has 5n nodes, layer 4 has 7× the area of layer 1 and thus has 7n nodes, layer 5 has 9× the area of layer 1 and thus has 9n nodes, and layer 6 has 11× the area of layer 1 and thus has 11n nodes. Accordingly, the density ratio for each layer 2, 3, 4, 5, and 6 is of 3:1, 5:3, 7:5, 9:7, and 11:9, respectively. Indeed, the multicast techniques described herein define a node density of (2*k+1):(2*(k−1)+1) for a layer k and k+1. Thus, (2*(k−1)+1) nodes may be directly connected to a next layer having at least 2*(k−1) nodes. In examples where the nodes represent AMI smart meters, Table 1 below shows per square mile density values for the nodes.

TABLE 1

Node Density Per Square Mile (DPSM)

| | Urban Density | Suburban Density | Rural Density |
|---|---|---|---|
| Node DPSM | 1000 | 250 | 50 |
| Nodes in layer 1 = n | 1000 | 250 | 50 |
| Nodes in layer 2 | 3000 | 750 | 150 |
| Nodes in layer 3 | 5000 | 1250 | 250 |
| Nodes in layer 4 | 7000 | 1750 | 350 |
| Nodes in layer 5 | 9000 | 2250 | 450 |
| Nodes in layer 6 | 11000 | 2750 | 550 |

As depicted in Table 1, if layer 1 is assumed to have an area of 1 square mile then number of nodes in layer 1 would be equal to 1000 in urban areas, 250 in suburban areas and 50 in rural areas. Using the ratio of nodes in each layer previous defined the nodes in each layer are as defined in Table 1 In this example, the ratio of nodes in all layers greater than layer 1 have a ratio of 3:1 or smaller, but in layer 1 to the edge router the ratio of nodes connecting to the edger outer takeout point is n:1 or 1000:1 for metro, 250:1 for suburban and 50:1 for rural. Because these ratios are much bigger than the 3:1 or smaller ratios of the higher layers the channel access scheme and capacity of the system is limited by the layer 1 to edge router capacity and channel access method. Such node density may be enabled as described in more detail below with respect to FIG. 3.

Figure 3:
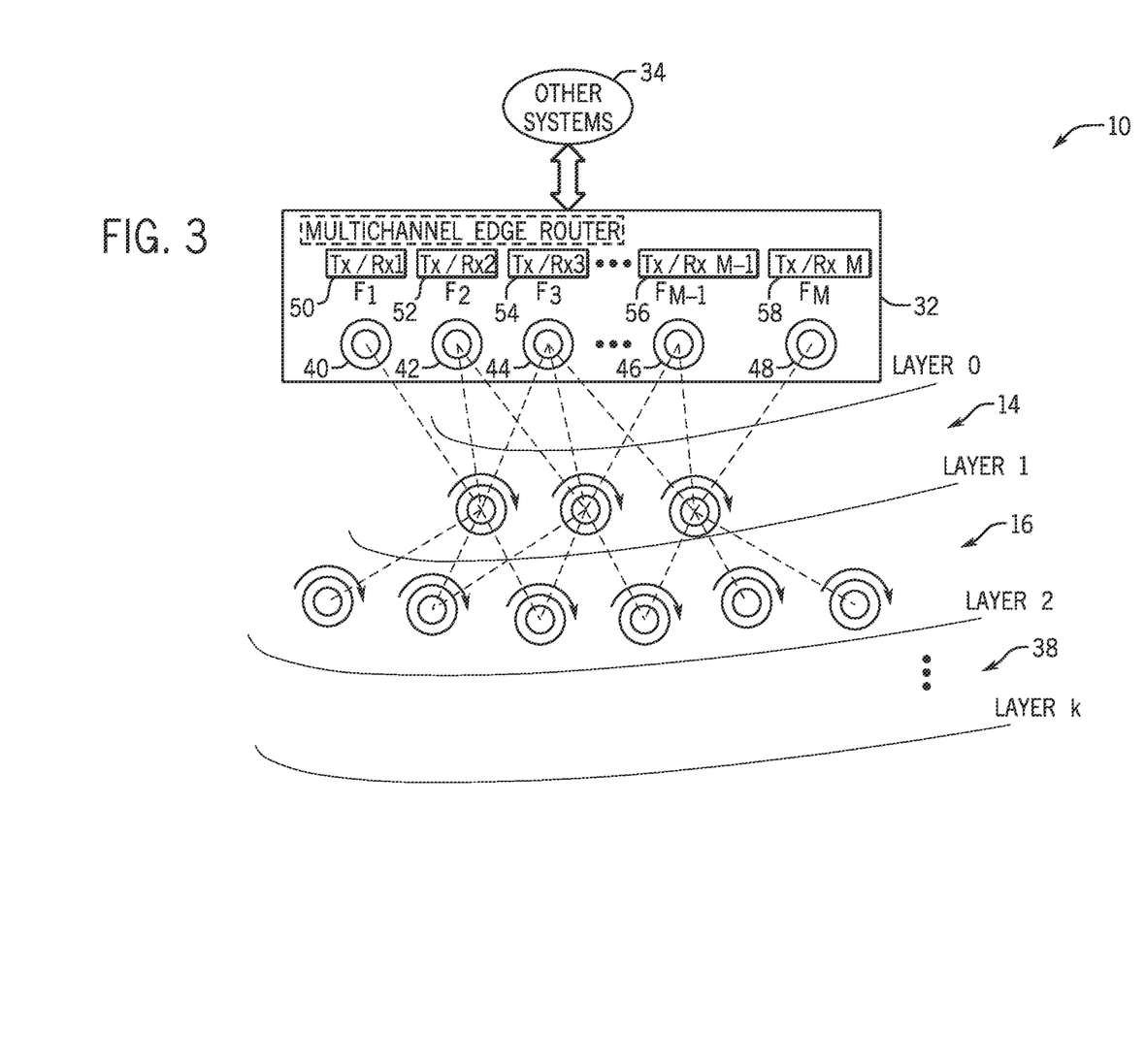
FIG. 3 is a block diagram illustrating an embodiment of a multichannel wireless edge router disposed in the multichannel wireless mesh network of FIG. 1.

FIG. 3 is a block diagram depicting an embodiment of the multichannel wireless mesh network 10, including the edge router 32 disposed on layer 0, the nodes 14 disposed on layer 1, the nodes 16 disposed on layer 2, and nodes 38 disposed on layer k. The network 10 is also communicatively connected to other systems 34 (e.g., electric, gas, water utilities) through the edge router 32. As depicted, the edge router 32 includes M fixed frequencies or frequency hopping patterns 40, 42, 44, 46, and 48. That is, the edge router 32 may be a multichannel edge router 32 suitable for using multiple channels M of communication, each channel communicating on a different frequency or set of frequencies 40, 42, 44, 46, and 48. The frequency ranges for frequencies 40, 42, 44, 46, and 48 may include any frequency range suitable for communicating with the nodes in the bottom layers 0-k. For example, any frequency ranges used by the IEEE 802.15, 4, IEEE 802.11 a/b/g/x, IEEE 802.11s. Indeed, any radio frequency may be used.

The edge router 32 includes a set of radio receivers 50, 52, 54, 56, and 58, suitable for receiving the frequencies 40, 42, 44, 46, and 48, respectively. In one embodiment, the receivers 50, 52, 54, 56, and 58 are implemented in hardware. In another embodiment, the receivers 50, 52, 54, 56, and 58 are implemented in software (e.g., software-defined radio). In this software embodiment, certain components, such as mixers, filters, amplifiers, modulators/demodulators, and/or detectors, are implemented by using non-transient computer instructions stored in a machine-readable medium executable by a computing device. In yet another embodiment, the receivers 50, 52, 54, 56, and 58 may include hardware receivers, software receivers, or a combination thereof.

The use of multiple receivers may significantly increase the ability of nodes 14, 16, 18, 20, 22, 24, and 38 to communicate and route packets in the network 10. In a single-channel mesh network, any one edge node's transmission on a particular communication channel creates a bottleneck and may potentially interfere with other node's communicating on that channel, depending on the distance between nodes in the single-channel network. This may result in increased collisions, increased dropped packets, and increased packet retransmissions throughout the entire network. By using multichannel communications, such as through the frequencies 40, 42, 44, 46, and 48, the edge router 32 effectively provides for the functionality of multiple edge routers 32. Indeed, each receiver 50, 52, 54, 56, and 58 may functionally provide the virtual equivalent of a traditional edge node. Additionally, certain processes, described in more detail below with respect to FIGS. 4 and 5, may be used to enable substantially higher throughput through the multichannel wireless mesh network 10.

Figure 4:
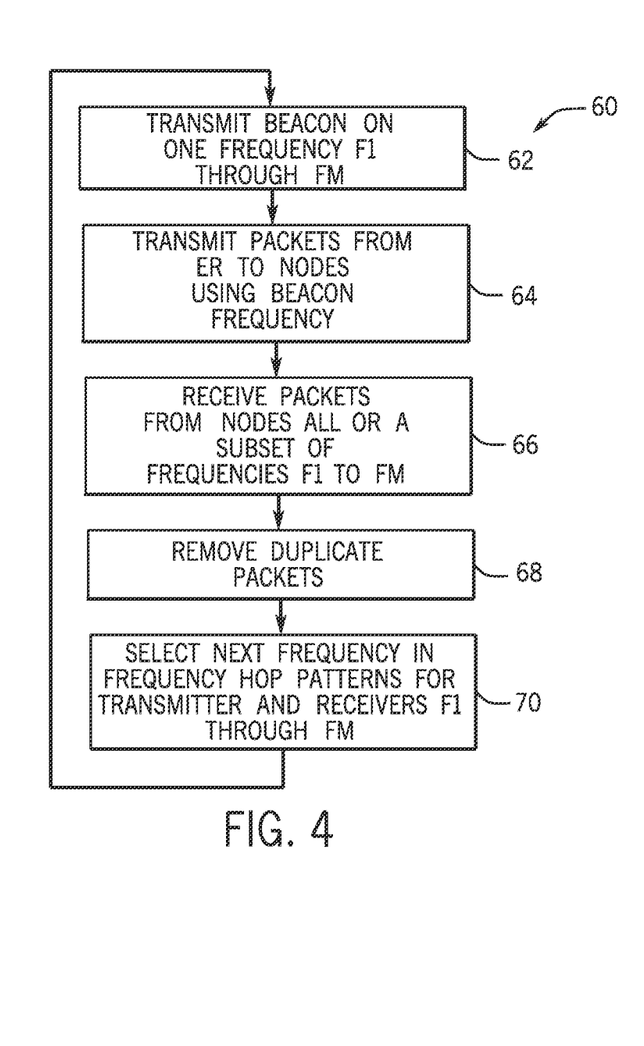
FIG. 4 is a flowchart of an embodiment of a process useful in routing data between level 0 and level 1 of the multichannel wireless mesh network of FIG. 1.

FIG. 4 is a flow chart depicting an embodiment of the edge router's process 60 suitable for transmitting or receiving data between the edge router 32 disposed in layer 0 and the nodes 14 disposed in layer 1 of the wireless mesh network 10. The process 60 may be implemented as non-transient, executable instructions stored in a machine-readable medium, such as memory, a computing device, a controller, etc. In the depicted example, the edge router 32 transmits a beacon on one of M frequencies (e.g., 40, 42, 44, 46, and 48) for the purpose of synchronization (block 62); then transmits data packets (block 64) to nodes 14 disposed in layer 1 of the network 10. Then, in block 66 receives data packets from nodes 14 disposed in layer 1 of the network 10; and in block 68 removes any duplicate packets. Then the process 60 selects the next frequency in the hop patterns for transmit and receive and repeats back to block 62. The process 60 also repeats by node 14 returning to block 76 to receive the next Edge Router 32 beacon.

Each node in the system has a random frequency hopping pattern with respect to receiving data from other nodes in the network, as shown in FIG. 4, where each node hops on M independent center frequency channels. There is a limit to the uniqueness given number of pattern is limited by the M number of available frequency channels. Each node discovers and synchronizes with nodes at the lowest layer it can reliably connect. Because each node in the system is using a different random hopping pattern the system spans the entire frequency set using up to M times the bandwidth of a node connection pair when sending data packets from layer N to lower layers of the mesh.

In the layer 1 to edge router connection in a prior art implementation all layer 1 nodes must transmit on a single frequency of the edge router receiver frequency set the edge router is using at that instance. To acquire the edge router receiver frequency hopping pattern the process 60 requires an unsynchronized node 14 on layer 1 to select a random frequency from a known set M (block 64) for nodes 14 to use to discover the network timing and configuration. In one embodiment, the process 60 may use a set of multiple M receivers each with its own individual frequency of the set of M frequencies (e.g., 2 to 1,000 frequencies), such as the frequencies 40, 42, 44, 46, and 48 associated with the receivers 50, 52, 54, 56, or 58. In this embodiment, different frequency sequences 40, 42, 44, 46, or 48 may be assigned to each node 14 that is disposed in layer 1. The system can support up to a factorial equation of nodes 14 without the need to limit the duty cycle that a particular node can transmit. The system can support a larger number of nodes at layer 1 to edge router by limiting the duty cycle a particular node can transmit. The number of nodes grow proportional to the duty cycle reduction.

The edge router 32 may then multicast or broadcast a beacon (block 66). The broadcasted beacon (block 66) may be received by all nodes 14 in layer 1 and used to synchronize the nodes 14 for subsequent transmission of data packets. In one example, the broadcast beacon (block 66) may be used as part of a channel access standard, such as time division multiple access (TDMA) incorporated in the IEEE 802.15.4 standard. The broadcast beacon (block 66) and associated TDMA protocols may then be used to synchronize (block 68) node 14 communications. For example, all nodes 14 may simultaneously (or near simultaneously) transmit data packets (block 70) that may then be received by the edge router 32. In this manner, all available frequencies 40, 42, 44, 46, and 48 may be used.

In one embodiment, the transmitted data packets (block 70) may not be acknowledged. Indeed, rather than send an acknowledge (ACK) data packet (and associated communications), the edge router 32 may save time and transmitive energy by not acknowledging the transmitted data packets (block 70). Instead, each node may hop frequencies (block 72) and retransmit the data packet, thus substantially minimizing or eliminating dropped data packets. Each data packet may be transmitted 2, 3, 4, 5, 6, M times, or more, where M is the total number of frequencies 40, 42, 44, 46, and 48 available. The frequency hop (block 72) may be sequential and cyclical. For example, for a node 14 that is assigned the frequency 40, the node 14 may then hop to frequency 42, then to frequency 44, then to frequency 46, then to frequency 48, and so on. When the last frequency is reached (e.g., frequency M), then the cycle may restart, with the next hop using the first frequency (e.g., frequency 40).

As depicted, after hopping frequencies (block 72), the nodes 14 may then iterate to block 70 to retransmit the data packet or to transmit a new data packet (block 70). Also as depicted, after hopping frequencies (block 72), the process may iterate to the broadcasting of the beacon (block 66), to enable the synchronization (block 68) of new nodes 14 that may have recently joined the network 10. By enabling the use of multiple frequencies 40, 42, 44, 46, and 48, including unlicensed frequencies, and by eliminating the use of ACK packets and associated communications, the process 60 may maximize frequency use while minimizing error-correction time and energy. Additionally, routing from levels 1 up to and including level k may also use all available frequencies, as described in more detail below with respect to FIG. 5.

Figure 5:
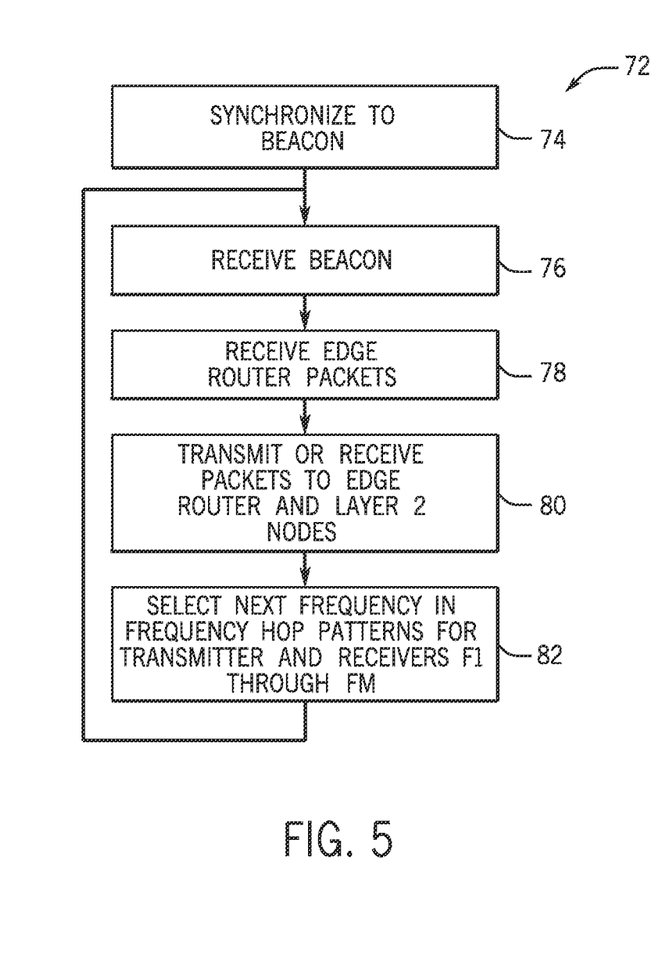
FIG. 5 is a flowchart of an embodiment of a process useful in routing data between level 1 and levels 2 through k of the multichannel wireless mesh network of FIG. 1.

FIG. 5 depicts an embodiment of a process 72 suitable for transmitting or receiving data between the nodes 14 disposed in layer 1 and the edge router 32 and nodes 16, 18, 20, 22, 24, and 38 disposed in layers 2, 3, 4, 5, and k of the wireless mesh network 10. As mentioned above, the multichannel wireless mesh network 10 using the multichannel edge router 32 enables a higher throughput of data when compared to a single channel network. The techniques disclosed herein provide for improved data throughput and reliability and may use various mesh implementations for mesh connectivity between layers 1, 2, 3, 4, 5, and k. The process 70 may be implemented as non-transient machine-readable instructions executable in a computing device.

In the depicted embodiment, the nodes 14 in layer 1 synchronize with the beacon to obtain TDMA timing and frequency hopping synchronization (block 74) used for communications. Once synchronized, each node 14 may begin receiving beacons (block 76) and packets from the edge router (block 78). In block 80 each of the nodes 14 transmits packets to the edge router or layer 2 devices. In block 82 the next hop is selected in the frequency hop pattern for the transmitter and receiver. Using this TDMA and frequency hopping process packets from node 14 are repeatedly sent to the edge router 1 to i times in separate TDMA slots using a different frequency in each slot. A process, such as a CRC32 error correction process, can be used at the edge router to determine successful packet transfer. Only one of the i packets needs to be received for successful packet transfer. Using multiple transmissions creates frequency and time diversity, greatly increasing the probability that a packet is transferred successfully, and eliminating the need to ACK packets.

For mesh connectivity between nodes 16, 18, 20, 22, 24, and 38 the network may use a variety of mesh implementations for connectivity between layers 1, 2, 3, 4, 5, and k, such as Ad hoc On-Demand Distance Vector (AODV), Better Approach to Mobile Ad hoc Networking (BATMAN), Babel, Dynamic Nix-Vector Routing (DSDV), Dynamic Source Routing (DSR), Hazy-Sighted Link State (HSLS), Hybrid Wireless Mesh Protocol (HWMP), Zone Routing Protocol (ZRP), and so on. By using the multichannel edge router for connectivity to layer 1 bandwidth of the network is significantly increased and latency is reduced, improving nodes' 16, 18, 20, 22, 24, and 38 communication performance with the edge router. Because each node 16, 18, 20, 22, 24, and 38 in the network 10 may be using a unique hopping pattern, the network 10 may span the entire frequency band simultaneously, including unlicensed frequencies, using up to M times the bandwidth of a node connection pair when moving data packets from layer n to nodes to on layer 1 of the network 10. Additionally, the communication between the nodes 16, 18, 20, 22, 24, and 38 in layers 2 through N may not use ACK packets. For example, the nodes 16, 18, 20, 22, 24, and 38 may retransmit data 2, 3, 4, 5, 6, 7, 8, 9 or 10 times, thus eliminating the use of ACK packets to provide acknowledgments of receipt or sending of data.

Technical effects of the invention include a wireless mesh network of nodes disposed in multiple layers, with the nodes on layer 1 directly connected to a multichannel edge router. The nodes on layer 1 may communicate with the edge router by hopping through multiple frequencies M simultaneously. Additionally or alternatively, the communications between the nodes on layer 1 and the edge router may eliminate the use of acknowledgement (ACK) packets, thus improving network throughput. In one embodiment, the ACK packets may be eliminated by transmitting data multiple times, thus providing for multiple copies of data packets.

Technical effects additionally include multichannel communications of the nodes in layers 2 through layer N using random frequency selection and TDMA-based hopping. By using randomness in the selection of the frequency, each node may include a unique hopping pattern. Accordingly, the use of multiple frequencies may be substantially improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising: an edge router, compromising:
    a transmitter circuitry configured to transmit a data on a plurality of M frequency hopped channels; and
    a multichannel receiver circuitry configured to:
        receive a plurality of packets on a plurality of independent frequencies transmitted by a plurality of nodes, wherein each of the plurality of nodes transmit over the plurality of independent frequencies, wherein the plurality nodes are configured in at plurality of network layers that includes at least a first network layer that includes a first plurality of nodes and a second network layer that includes a second plurality of nodes, wherein the first plurality of nodes communicate with the edge router and the second plurality of nodes, wherein the second plurality of nodes is configured to communicate with the first plurality of nodes, and wherein a ratio of a number of nodes in the second plurality of nodes to a number of nodes in the first plurality of nodes is three to one;
        simultaneously receive, from a first node of the plurality of nodes, a first packet on a first frequency of the plurality of independent frequencies and receive, from a second node of the plurality of nodes, the first packet on a second frequency of the plurality of independent frequencies;
    wherein the multichannel receiver circuitry is configured to provide for a packet exchange protocol by receiving a packet in the plurality of packets a plurality of times without using an acknowledgement packet (ACK) or reply message; and
    wherein the edge router is configured to:
        discard one or more extra received copies of the first packet; and
        transmit a single copy of the first packet.

2. The system of claim 1, wherein a first node of the plurality of nodes is configured to hop to the second frequency and a second node is configured to hop to the first frequency after a passage of a first time, and a time synchronization is provided via a beacon signal by the edge router.

3. The system of claim 2, wherein the first time comprises a time division multiple access (TDMA) timeslot.

4. The system of claim 2, wherein the first node is configured to hop to the first frequency and the second node is configured to hop to the second frequency after the passage of a second time.

5. The system of claim 1, wherein the edge router is configured to use a beacon signal to synchronize direct communications with the first node and with the second node.

6. The system of claim 1, wherein the first node is disposed on the first network layer, and wherein the first node is configured to directly communicate with a third node disposed on the second network layer of the mesh network, and the third node is not configured to directly communicate with the edge router.

7. The system of claim 6, wherein the third node is configured to derive a frequency hopping pattern and use the frequency hopping pattern to communicate within the mesh network.

8. The system of claim 7, wherein the third node is configured to select a third fixed random frequency hopping pattern uncorrelated to the edge router frequencies and other nodes to the extent allowed given the limitation of the number of M frequencies available in the system.

9. The system of claim 8, wherein the third frequency comprises an unlicensed frequency.

10. The system of claim 8, wherein the third node is configured to hop through the range of frequencies by using the frequency hopping pattern in a cyclical manner, in a random manner, or a combination thereof.

11. The system of claim 1, wherein the first node comprises an advanced metering infrastructure (AMI) smart meter.

12. The system of claim 1, wherein each network layer of the plurality of network layers has a relationship with other network layers based on a number of nodes in each of the respective network layers, such that a node density between a network layer k and a network layer k+1 may be defined by $(2*k+1):(2*(k-1)+1)$.

13. A system comprising:
a multi-channel edge router comprising a plurality of receivers configured to use a plurality of frequencies, wherein each of the plurality of receivers is configured to communicate on a different frequency; and
a non-transitory machine-readable medium comprising code configured to:
receive data from a plurality of nodes in direct communication with the multi-channel edge router, wherein the data is received over a plurality of independent frequencies, wherein the plurality nodes are configured in at plurality of network layers that includes at least a first network layer that includes a first plurality of nodes and a second network layer that includes a second plurality of nodes, wherein the first plurality of nodes communicate with the edge router and the second plurality of nodes, wherein the second plurality of nodes is configured to communicate with the first plurality of nodes, and wherein a ratio of a number of nodes in the second plurality of nodes to a number of nodes in the first plurality of nodes is three to one;
broadcast a beacon;
synchronize a transmission of data from each of the plurality of nodes based on the beacon;
receive a first packet simultaneously from a first node of the plurality of nodes on a first frequency and a second node of the plurality of nodes on a second frequency to the multi-channel edge router approximately simultaneously a plurality of times redundantly so that the use of an acknowledgement packet (ACK) or reply message is not required for reliable packet transfer from a node to the edge router;
discard one or more extra received copies of the first packet; and
transmit a single copy of the first packet.

14. The system of claim 13, wherein the plurality of nodes is configured to transmit and receive data on a set of M frequency hopped channels.

15. The system of claim 13, comprising the plurality of nodes, wherein the code configured to transmit the data from each of the plurality of nodes to the multi-channel edge router is included in each of the plurality of nodes.

16. A method, comprising:
selecting a first radio frequency at random;
discovering a first node disposed on a wireless mesh network, wherein the first node is not in direct communication with a multi-channel edge router, wherein the plurality nodes are configured in at plurality of network layers that includes at least a first network layer that includes a first plurality of nodes and a second network layer that includes a second plurality of nodes, wherein the first plurality of nodes communicate with the edge router and the second plurality of nodes, wherein the second plurality of nodes is configured to communicate with the first plurality of nodes, and wherein a ratio of a number of nodes in the second plurality of nodes to a number of nodes in the first plurality of nodes is three to one;
assigning a first frequency hopping pattern to the first node based on the first radio frequency; and
communicating data between the first node and the multi-channel edge router by using an intermediate node, wherein the intermediate node is in direct communication with the multi-channel edge router and with the first node, and wherein the first node is configured to use the first frequency hopping pattern to communicate with the intermediate node, wherein the intermediate node is configured to communicate with the multi-channel edge router without using an acknowledgement (ACK) or reply message, wherein the multi-channel edge router is configured to simultaneously receive a first packet on a first frequency from the intermediate node and receive the first packet on a second frequency from a different intermediate node, and wherein the multi-channel edge router is further configured to discard one or more extra received copies of the first packet and transmit a single copy of the first packet.

17. The method of claim 16, wherein the first node is configured to cyclically hop through a plurality of frequencies when using the first frequency hopping pattern to communicate with the intermediate node.

18. The method of claim 16, wherein the first node is configured to randomly hop through a plurality of frequencies when using the first frequency hopping pattern to communicate with the intermediate node.

19. The method of claim 16, comprising:
selecting a second radio frequency at random;
discovering a second node disposed on the wireless mesh network, wherein the second node is not in direct communication with the multi-channel edge router;
assigning a second frequency hopping pattern to the second node based on the second radio frequency; and
communicating data between the second node and the multi-channel edge router by using the intermediate node, wherein the intermediate node is in direct communication with the multi-channel edge router and with the second node, and wherein the second node is configured to use the second frequency hopping pattern to communicate with the intermediate node.

20. The method of claim 19, comprising transmitting and receiving data on a set of M frequency hopped channels via more than two nodes.

* * * * *